(12) United States Patent
Liu

(10) Patent No.: US 9,094,319 B2
(45) Date of Patent: *Jul. 28, 2015

(54) CROSS-DOMAIN EXCHANGE SYSTEM OF EQUIPMENT LISTS AND METHOD

(71) Applicant: Gemtek Technology Co., Ltd., Hsinchu (TW)

(72) Inventor: Hsiang-Chun Liu, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 358 days.

This patent is subject to a terminal disclaimer.

(21) Appl. No.: 13/831,950

(22) Filed: Mar. 15, 2013

(65) Prior Publication Data

US 2013/0326043 A1 Dec. 5, 2013

Related U.S. Application Data

(60) Provisional application No. 61/654,951, filed on Jun. 4, 2012.

(51) Int. Cl.
*H04L 12/24* (2006.01)
(52) U.S. Cl.
CPC ..................................... *H04L 41/12* (2013.01)

(58) Field of Classification Search
None
See application file for complete search history.

(56) References Cited

U.S. PATENT DOCUMENTS

| 2009/0210555 | A1* | 8/2009 | Han et al. | 709/238 |
| 2009/0303926 | A1* | 12/2009 | Den Hartog et al. | 370/328 |
| 2012/0158900 | A1* | 6/2012 | Kim et al. | 709/217 |
| 2013/0132595 | A1* | 5/2013 | Cho et al. | 709/228 |

* cited by examiner

*Primary Examiner* — Chirag Shah
*Assistant Examiner* — Amar Persaud
(74) *Attorney, Agent, or Firm* — Jianq Chyun IP Office

(57) ABSTRACT

The invention provides a CDeX system of equipment lists and a method thereof, the method includes following steps: scanning electronic devices in the first LAN conformable to the UPnP protocol by the first OTT-box to thereby establish a first equipment list; when the first router is capable of communicate with a second LAN through a wireless network tunnel, delivering the first equipment list to the first router by the first OTT-box; accessing a second identifier of the second router by the first OTT-box; delivering the first equipment list to the second router in the second LAN by the first router according to the second identifier; and delivering a second equipment list provided by the second OTT-box to the first router by the second router, in which the second equipment list is corresponding to electronic devices in the second LAN conformable to the UPnP protocol.

8 Claims, 3 Drawing Sheets

CROSS-DOMAIN EXCHANGE SYSTEM OF EQUIPMENT LISTS AND METHOD

CROSS-REFERENCE TO RELATED APPLICATION

This application claims the priority benefits of U.S. provisional application Ser. No. 61/654,951, filed on Jun. 4, 2012. The entirety of the above-mentioned patent applications is hereby incorporated by reference herein and made a part of this specification.

BACKGROUND OF THE INVENTION

1. Field of the Invention

The invention generally relates to a cross-domain exchange system of equipment lists (CDeX system of equipment lists) and a method thereof, and more particularly, to a CDeX system of equipment lists and a method thereof where the universal plug and play protocol (UPnP protocol) is used in sharing different domain resources.

2. Description of Related Art

Since the current UPnP protocol and digital living network alliance protocol (DLNA protocol) are network technologies for local area as default, so that if needing across the Internet, then, it must be achieved through the router's port-mapping redirection technology. However, such a mechanism would be limited by a plurality of network routers (eg: wireless network sharing router) owned by a local area home. When the quantity of the network routers is too many for example, the network packet fails passing through the layers of the routers to arrive at the network nodes configured in another family.

SUMMARY OF THE INVENTION

Accordingly, the invention provides a CDeX system of equipment lists, which is suitable for exchanging of a first equipment list in a first local area network (LAN) and a second equipment list in a second LAN through a wireless network tunnel. The system includes a first router, a first over-the-top content box (first OTT-box), a second router and a second OTT-box. The first router in the CDeX system of equipment lists has a first identifier, the first OTT-box is connected to the first router and the first OTT-box scans electronic devices in the first LAN conformable to the UPnP protocol. Accordingly, the first equipment list is established and it is detected whether or not the first router is capable of communicating with the second LAN through the above-mentioned wireless network tunnel. If the above-mentioned judgement result is YES, the first OTT-box delivers the first equipment list to the first router, and the second router is connected to the second OTT-box. After the first OTT-box accesses a second identifier of the second router, the first router, according to the second identifier, delivers the first equipment list to the second router, and then, the second router delivers the second equipment list provided by the second OTT-box to the first router, in which the second equipment list is corresponding to the electronic devices in the second LAN conformable to the UPnP protocol.

In an embodiment of the invention, the second OTT-box periodically links the second router to obtain the first equipment list of the first router communicated with the second router.

In an embodiment of the invention, the CDeX system of equipment lists further includes using the first OTT-box to establish the second equipment list in a first storage unit in the first OTT-box through the linking of the wireless network tunnel and using the second OTT-box to establish the first equipment list in a second storage unit in the second OTT-box through the linking of the wireless network tunnel.

In an embodiment of the invention, the CDeX system of equipment lists further includes using the first OTT-box to link the Internet to obtain a first network address prior the first OTT-box scans the electronic devices in the first local area network conformable to the UPnP protocol.

In an embodiment of the invention, in the CDeX system of equipment lists, the step for the first OTT-box to access a second identifier of the second router includes adding the second identifier in a white list of a first router access module in the first OTT-box.

In an embodiment of the invention, the CDeX system of equipment lists further includes: when the first router is not capable of communicating with the second LAN through the wireless network tunnel, the first OTT-box controls each of the electronic devices in the first LAN to perform an internal resource sharing according to a local network mode.

The invention provides a CDeX method of equipment lists, which is suitable for exchanging equipment lists between a first OTT-box in a first LAN with a first router connected to the first OTT-box and a second over-the-top content box in a second LAN with a second router connected to the second OTT-box through a wireless network tunnel. The method includes following steps: scanning electronic devices in the first LAN conformable to the UPnP protocol by the first OTT-box to thereby establish a first equipment list; detecting whether or not the first router is capable of communicating with the second LAN through the wireless network tunnel; if the above-mentioned judgement result is YES, delivering the first equipment list to the first router by the first OTT-box; accessing a second identifier of the second router by the first OTT-box; delivering the first equipment list to the second router by the first router according to the second identifier; and delivering a second equipment list provided by the second OTT-box to the first router by the second router, in which the second equipment list is corresponding to electronic devices in the second LAN conformable to the UPnP protocol.

Based on the description above, the invention provides a cross-domain exchange system of equipment lists and a method thereof. The system adds the unique identifier of a router of a remote LAN into the white list in a local OTT-box to make the local router conformable to the wireless network tunnel and the remote routers in other LANs conformable to the wireless network tunnel automatically exchange the equipment lists in their own LANs one another.

In order to make the features and advantages of the present invention more comprehensible, the present invention is further described in detail in the following with reference to the embodiments and the accompanying drawings.

DESCRIPTION OF THE EMBODIMENTS

Figure 1A:
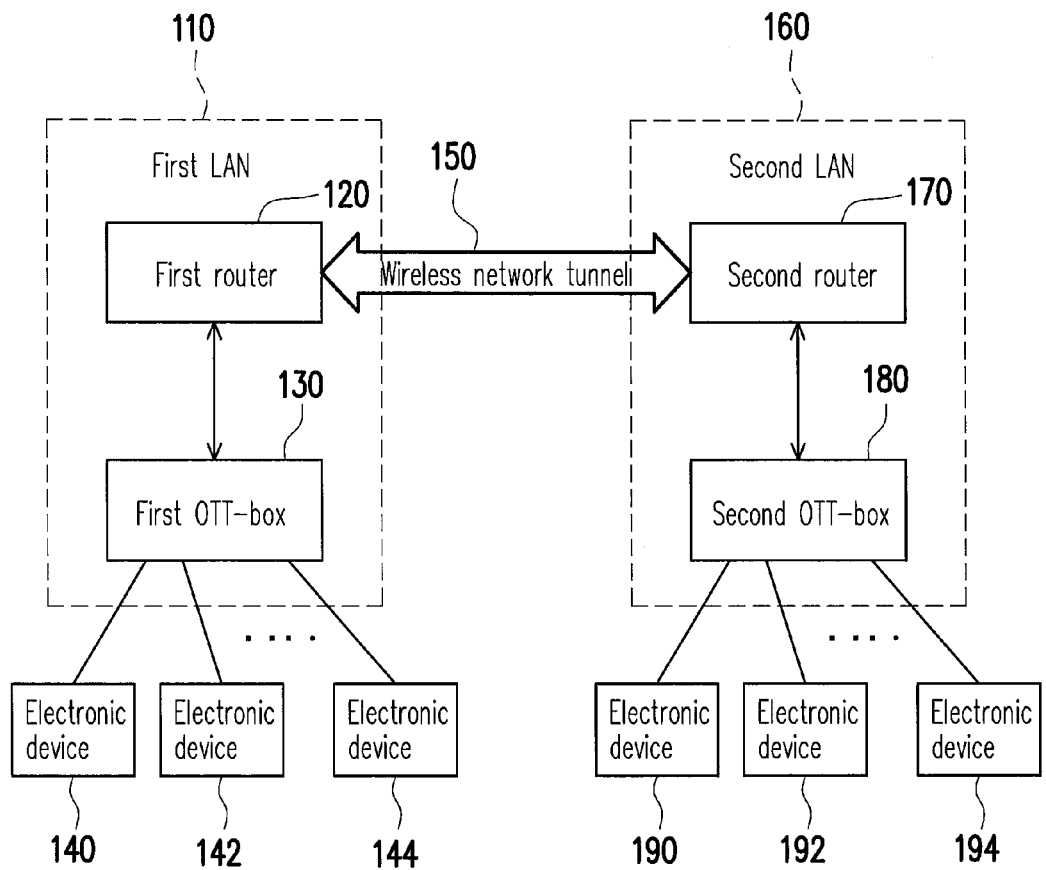
FIG. 1A is a function block chart of a CDeX system of equipment lists according to an embodiment of the invention.

FIG. 1A is a function block chart of a CDeX system of equipment lists according to an embodiment of the invention.

The CDeX system of equipment lists uses a wireless network tunnel 150 to conduct exchange of a first equipment list in a first LAN 110 and a second equipment list in a second LAN 160. The first LAN 110 includes a first router 120, a first OTT-box 130 and a plurality of electronic devices connected to the OTT-BOX 130 therein (such as electronic devices 140, 142 and 144 in FIG. 1A), in which the first router 120 has a first identifier, and the first router 120 and the first OTT-box 130 are connected to each other. The second LAN 160 includes a second router 170, a second OTT-box 180 and a plurality of electronic devices connected to the OTT-BOX 180 therein (such as electronic devices 149, 192 and 194 in FIG. 1A), in which the second router 170 has a second identifier, and the second router 170 and the second OTT-box 180 are connected to each other. In an embodiment of the invention, the first LAN 110 can be seen as a family's home area network, while the second LAN 160 can be seen as another family's home area network. The above-mentioned electronic devices are conformable to the UPnP protocol, for example, a webcam (network IP camera), a network-attached storage (NAS), a network power controller, a DLNA digital media server (DLNA DMS) or a DLNA digital media renderer (DLNA DMR) conformable to the UPnP protocol.

Figure 2:
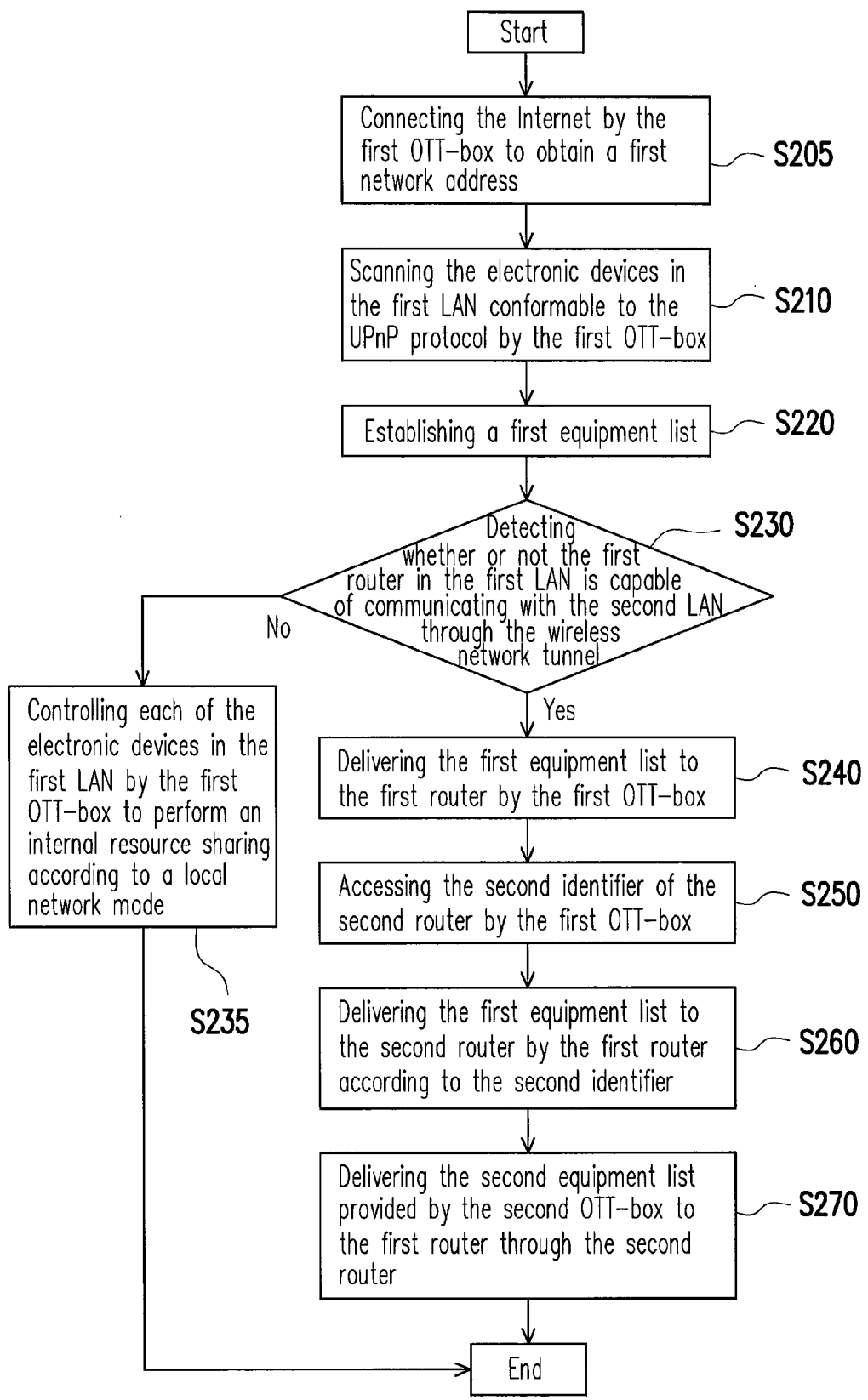
FIG. 2 is a flowchart of a CDeX method of equipment lists according to an embodiment of the invention.

FIG. 2 is a flowchart of a CDeX method of equipment lists according to an embodiment of the invention. Referring to FIGS. 1A and 2, first, the first OTT-box 130 is connected to the Internet to obtain a first network address (step S205). Next, the first OTT-box 130 scans the electronic devices in the first LAN 110 conformable to the UPnP protocol (such as electronic devices 140, 142 and 144) (step S210), and the first OTT-box 130 thereby establishes a first equipment list at a plurality of electronic devices in the first LAN 110 (step S220). Then, the first OTT-box 130 detects whether or not the first router 120 in the first LAN 110 is capable of communicating with the second LAN 160 through the above-mentioned wireless network tunnel 150 (step S230).

On the other hand, in the second LAN 160, the second OTT-box is connected to the Internet to obtain a second network address. Then, the second OTT-box 180 scans the electronic devices in the second LAN 160 conformable to the UPnP protocol (such as electronic devices 190, 149 and 194), and, as above-mentioned steps S210-S220, the second OTT-box 180 thereby establishes a second equipment list.

After step S220, if the judgment result in step S230 is NO, the first OTT-box 130 controls each of the electronic devices in the first LAN to perform an internal resource sharing according to a local network mode (step S235); if the judgment result in step S230 is YES, the first OTT-box 130 delivers the first equipment list to the first router 120 (step S240). After step S240, the first OTT-box 130 accesses the second identifier of the second router 170 (step S250). Then, according to the second identifier, the first router 120 delivers the first equipment list to the second router 170 (step S260), in which the second OTT-box 180 periodically links the second router 170 to obtain following a timing the first equipment list delivered by the first router 120 communicated with the second router 170. Differently from step S260 performed by the first router 120, the second router 170 delivers the second equipment list provided by the second OTT-box 180 to the first router 120 (step S270).

Figure 1B:
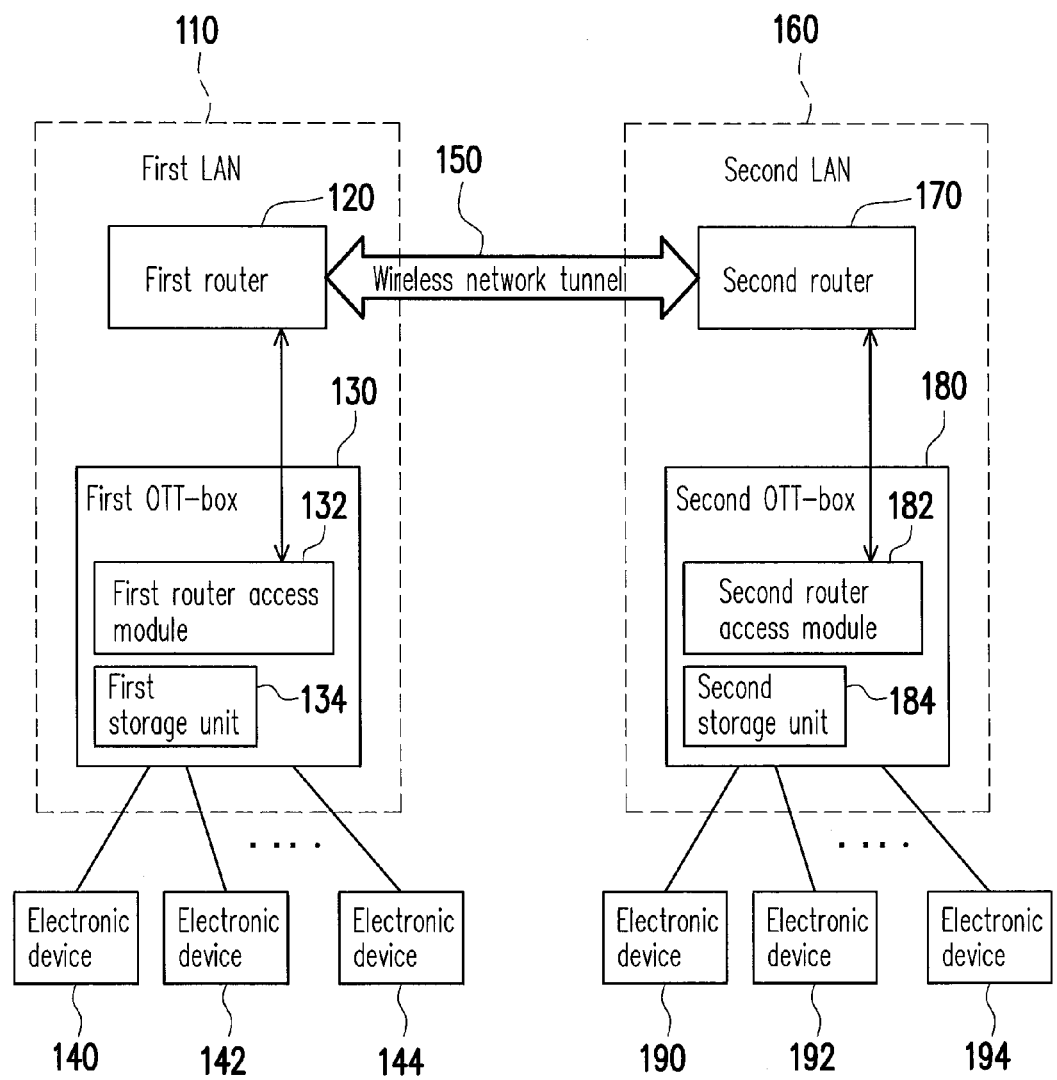
FIG. 1B is another function block chart of a CDeX system of equipment lists according to an embodiment of the invention.

FIG. 1B is another function block chart of a CDeX system of equipment lists according to an embodiment of the invention. The embodiment of FIG. 1B is a modified one of FIG. 1A, and the embodiment of FIG. 1B can conduct the above-mentioned steps S205-S270. Most of the parts in FIG. 1B are the same as FIG. 1A, the same portion is omitted for simplicity and the difference is described as following. In the embodiment of FIG. 1B, in the above-mentioned step S250, the method for the first OTT-box 130 to access the second identifier of the second router 170 is that the second identifier is added into a white list of a first router access module (RAM) 132 in the first OTT-box 130 by the first OTT-box 130. In other words, at the time, if the second OTT-box 180 is going to access the first identifier of the first router 120, it can be achieved through adding the first identifier into the white list of a second RAM 182 in the second OTT-box 180 by the second OTT-box 180. In addition, the embodiment of FIG. 1B further includes the first OTT-box 130 establishes the second equipment list in a first storage unit 134 in the first OTT-box 130 through the linking of the wireless network tunnel 150, and the second OTT-box 180, through the linking of the wireless network tunnel 150, establishes the first equipment list in a second storage unit 184 in the second OTT-box 180. In this way, a user located at the first LAN 110 can read the equipment list in the second LAN 160 and directly be aware of all the electronic devices connected to the second OTT-box 180 in the second LAN 160 (the electronic devices 190, 192 and 194), which facilitates the user in the scope of the first LAN 110 to access various multimedia resources in the second LAN 160 through the wireless network tunnel 150.

In summary, the invention provides a cross-domain exchange system of equipment lists and a method thereof. The system adds the unique identifier of a router of a remote LAN into the white list in a local OTT-box to make the local router conformable to the wireless network tunnel and the remote routers in other LANs conformable to the wireless network tunnel automatically exchange the equipment lists in their own LANs one another. Under a family's home network architecture, if the OTT-box provided by the invention is a digital home control center, in addition to controlling all the devices in the home LAN connected to the DLNA/UPnP device of the OTT-box, the OTT-box is able to connect the remote home area network and read the DLNA/UPnP device of the remote home area network through the wireless network tunnel as well. Based on the invention technique, the LAN user can play multimedia on a remote server, control a remote power controller and view the video of a remote webcam. In other words, the DLNA/UPnP technique originally used in an LAN can be used for a remote area network by the invention.

It will be apparent to those skilled in the art that the descriptions above are several preferred embodiments of the invention only, which does not limit the implementing range of the invention. Various modifications and variations, or equivalent replacing on a part or all the above-mentioned features can be made, which are without departing from the scope or spirit of the embodiments of the invention.

What is claimed is:

1. A cross-domain exchange system of equipment lists, suitable for exchange of a first equipment list in a first local area network and a second equipment list in a second local area network through a wireless network tunnel; which comprising:

a first router, having a first identifier;

a first over-the-top content box, connected to the first router, wherein the first over-the-top content box scans electronic devices in the first local area network conformable to the UPnP protocol to thereby establish the first equipment list and detect whether or not the first router is capable of communicating with the second local area network through the above-mentioned wireless network tunnel, and if the above-mentioned judgement result is YES, the first over-the-top content box delivers the first equipment list to the first router;

a second over-the-top content box;

a second router, connected to the second over-the-top content box; and using the first over-the-top content box to access a second identifier of the second router, wherein the first router, according to the second identifier, delivers the first equipment list to the second router and the second router delivers the second equipment list provided by the second over-the-top content box to the first router, wherein the second equipment list is corresponding to electronic devices in the second local area network conformable to the UPnP protocol;

wherein the second over-the-top content box periodically links the second router to obtain the first equipment list of the first router communicated with the second router;

using the first over-the-top content box to establish the second equipment list in a first storage unit in the first over-the-top content box through the linking of the wireless network tunnel and using the second over-the-top content box to establish the first equipment list in a second storage unit in the second over-the-top content box through the linking of the wireless network tunnel.

2. The cross-domain exchange system of equipment lists as claimed in claim 1, further comprising using the first over-the-top content box to link the Internet to obtain a first network address prior the first over-the-top content box scans the electronic devices in the first local area network conformable to the UPnP protocol.

3. The cross-domain exchange system of equipment lists as claimed in claim 1, wherein the step for the first over-the-top content box to access a second identifier of the second router comprises adding the second identifier in a white list of a first router access module in the first over-the-top content box.

4. The cross-domain exchange system of equipment lists as claimed in claim 1, further comprising: when the first router is not capable of communicating with the second local area network through the wireless network tunnel, the first over-the-top content box controls each of the electronic devices in the first local area network to perform an internal resource sharing according to a local network mode.

5. A cross-domain exchange method of equipment lists, suitable for exchanging equipment lists between a first over-the-top content box in a first local area network with a first router connected to the first over-the-top content box and a second over-the-top content box in a second local area network with a second router connected to the second over-the-top content box through a wireless network tunnel; which comprising:

scanning electronic devices in the first local area network conformable to the UPnP protocol by the first over-the-top content box to thereby establish a first equipment list;

detecting whether or not the first router is capable of communicating with the second local area network through the wireless network tunnel;

if the above-mentioned judgement result is YES, delivering the first equipment list to the first router by the first over-the-top content box;

accessing a second identifier of the second router by the first over-the-top content box;

delivering the first equipment list to the second router by the first router according to the second identifier; and delivering a second equipment list provided by the second over-the-top content box to the first router by the second router according to a first identifier of the first router, wherein the second equipment list is corresponding to electronic devices in the second local area network conformable to the UPnP protocol;

periodically linking the second router by the second over-the-top content box to obtain the first equipment list of the first router communicated with the second router;

using the first over-the-top content box to establish the second equipment list in a first storage unit in the first over-the-top content box through the linking of the wireless network tunnel; and using the second over-the-top content box to establish the first equipment list in a second storage unit in the second over-the-top content box through the linking of the wireless network tunnel.

6. The cross-domain exchange method of equipment lists as claimed in claim 5, further comprising:

using the first over-the-top content box to link the Internet to obtain a first network address prior the first over-the-top content box scans the electronic devices in the first local area network conformable to the UPnP protocol.

7. The cross-domain exchange method of equipment lists as claimed in claim 5, wherein the step for the first over-the-top content box to access a second identifier of the second router comprises:

adding the second identifier in a white list of a first router access module in the first over-the-top content box.

8. The cross-domain exchange method of equipment lists as claimed in claim 5, further comprising:

when the first router is not capable of communicating with the second local area network through the wireless network tunnel, controlling each of the electronic devices in the first local area network by the first local area network to perform an internal resource sharing according to a local network mode.

* * * * *